United States Patent [19]

Yamamoto et al.

[11] Patent Number: 4,841,327
[45] Date of Patent: Jun. 20, 1989

[54] CAMERA SYSTEM

[75] Inventors: Hiroshi Yamamoto; Nobuyuki Suzuki, both of Kanagawa, Japan

[73] Assignee: Canon Kabushiki Kaisha, Tokyo, Japan

[21] Appl. No.: 141,715

[22] Filed: Jan. 11, 1988

[30] Foreign Application Priority Data

Jan. 12, 1987 [JP] Japan .................................. 62-4590
Jan. 12, 1987 [JP] Japan .................................. 62-4591
Jan. 19, 1987 [JP] Japan .................................. 62-9441

[51] Int. Cl.$^4$ ................................................ G03B 7/00
[52] U.S. Cl. ..................................... 354/412; 354/452; 354/271.1; 354/152
[58] Field of Search ............... 354/412, 446, 451, 452, 354/152, 271.1, 286

[56] References Cited

U.S. PATENT DOCUMENTS

| | | | |
|---|---|---|---|
| 3,911,453 | 10/1975 | Ohmori | 354/154 |
| 4,062,028 | 12/1977 | Tezuka et al. | 354/271.1 |
| 4,299,459 | 11/1981 | Mizokami | |
| 4,443,083 | 4/1984 | Nakano | 354/271.1 |
| 4,460,253 | 7/1984 | Kawai et al. | 354/271.1 |
| 4,657,368 | 4/1987 | Kawamura | 354/452 |
| 4,659,201 | 4/1987 | Suzuki et al. | 354/152 |
| 4,679,925 | 7/1987 | Kawamura et al. | 354/412 |

FOREIGN PATENT DOCUMENTS

56-137127 3/1980 Japan .

Primary Examiner—Russell E. Adams
Attorney, Agent, or Firm—Fitzpatrick, Cella, Harper & Scinto

[57] ABSTRACT

A camera system having a camera body and an interchangeable lens which is detachably mountable on the camera body, in which a camera body includes a first motor and driving means arranged to be operated by a power source, the lens body includes a second motor and driving means to drive a diaphragm both to a stop down and to open its aperture. The system is provided with control means arranged to drive the diaphragm to stop down the aperture after the lapse of a given period of time from commencement of the upward movement of the mirror, and to actuate the second motor to cause the diaphragm driving means to drive the diaphragm to open the aperture after the lapse of a given period of time from the end of the downward movement of the mirror, such that the peaks of high voltage use are staggered, lessening the strain on the power source and ensuring reliable operation even at low temperatures.

28 Claims, 5 Drawing Sheets

CAMERA SYSTEM

BACKGROUND OF THE INVENTION

1. Field of the Invention

This invention relates to a camera system of the kind having a motor-driven diaphragm disposed within an interchangeable lens.

2. Description of the Related Art

The 35 mm camera of a type using a non-interchangeable lens is generally called a compact camera. The camera of that type has a so-called lens-shutter device which is arranged to serve both as a shutter and a diaphragm. In addition to that, it is a general tendency to have the camera of that type arranged to automatically wind and rewind a film by using a power source disposed within the camera. The camera of another type called a single-lens reflex camera which uses an interchangeable lens is also provided with a power source arranged within the camera for operating various devices including an automatic exposure device, an automatic film winding device, an automatic focusing device and an automatic film rewinding device. However, since the power source voltage is limited, the power source must be efficiently used by time serially carrying out the complex processes of these devices.

Cameras of the kind using a motor for preparatory processes such as film feeding, shutter charging and for driving the diaphragm have recently been proposed. One example of them has been disclosed in Japanese Patent Application Laid-Open No. SHO 49-95621. In the case of cameras of this kind, an automatic film winding process begins during the process of fully opening the diaphragm aperture by the above stated automatic exposure device. The simultaneous performance of the diaphragm driving and film feed driving actions results in an excessively large consumption of electrical energy. This has been apt to cause a failure or a faulty action of the electrical circuits of the camera. In addition as the power source voltage drops at low temperature, the above stated problem becomes more serious under a low temperature condition.

A camera of the kind performing a mirror driving action and a diaphragm driving action by means of motors separately provided for these purposes has recently been proposed (Japanese Patent Application Laid-Open No. SHO 49-95621). However, that arrangement is not suited for a camera as it necessitates an increase in the capacity of the power source. In addition to that problem, the camera of that type tends to malfunction when the power source voltage drops under a low temperature condition.

A camera which is arranged to prevent overlapping of rush currents by somewhat staggering the driving start time of the film winding motor and that of the shutter charging motor after completion of an exposure is disclosed in U.S. Pat. No. 4,659,201. The advantage of this arrangement is furthered by the present invention, whereby a problem resulting from simultaneous or overlapped driving actions of a motor disposed within a camera body and another motor disposed within an interchangeable lens used as an accessory is solved by virtue of an arrangement for communication between the interchangeable lens and the camera body.

Further, cameras of the kind using a stepper motor which is of a simple structure and permits the manufacture of a control circuit at a reduced cost have recently been proposed. In the conventional camera of this kind, the rotator of the stepper motor is formed with a permanent magnet. However, while the diaphragm aperture of the camera is designed to be normally in a full aperture position, the aperture has often been accidentally stopped down by some impacts or vibrations.

To solve this problem, there has been proposed a technique for bringing the diaphragm back into its full aperture position by allowing the stepper motor to rotate in the direction of opening the aperture in case that the diaphragm is not in the full aperture position at the beginning of a photometric action before a shutter release action, as disclosed, for example, in Japanese Patent Application Laid-Open No. SHO 58-111022. This proposed improvement, however, has presented the following problem: In cases where the diaphragm aperture has been accidentally stopped down by vibrations of the camera or the like, the full aperture is not obtainable unless a photometric switch is actuated. Therefore, when the photographer looks into the view finder of the camera, it might be too dark for a focusing operation because of the stopped down aperture. Further, even if the focusing operation could be accomplished, the depth of field is deep under that condition as the aperture is stopped down. Therefore, a picture which is then actually taken by pushing the shutter release button with the stopped-down aperture adjusted closer to a full aperture position would be out of focus. Further, the arrangement to bring the diaphragm back into its full aperture position by operating a photometric switch requires an additional length of time, which prevents seizing a shutter chance.

SUMMARY OF THE INVENTION

It is one object of this invention to provide a camera system having a camera body and an interchangeable lens arranged to exchange electrical signals through contacts between them, in which a diaphragm is arranged to be brought back to its full aperture position after an exposure; and electrical circuits are prevented from failing to operate or from malfunctioning due to a drop in a power source voltage by allowing a motor to begin film winding only after detection of the full aperture position of the diaphragm.

It is another aspect of the invention to provide a camera system having a camera body and an interchangeable lens arranged to exchange electrical signals through contacts between them, in which a failure or a malfunction due to a drop in the power source voltage is prevented by staggering the timing of the peak of a power supply to a motor provided for driving a mirror and that of the peak of a power supply to a motor provided for driving a diaphragm.

It is a further object of this invention to provide a camera system having a camera body and an interchangeable lens arranged to exchange electrical signals through contacts between them, in which, with a diaphragm arranged within the interchangeable lens to be driven by a motor, the diaphragm is arranged to be promptly brought into a stand-by state in a full aperture position; and photographing can be carried out the instant accurate exposure information is obtained.

These and further objects and features of this invention will become apparent from the following detailed description of preferred embodiments thereof taken in connection with the accompanying drawings.

BRIEF DESCRIPTION OF THE DRAWINGS

FIGS. 1 to 3 show a first embodiment of this invention. Of these drawings, FIG. 1 schematically shows the arrangement of essential circuit elements of motor driving devices disposed within a camera body and a lens.

FIGS. 4 and 5 show a second embodiment of the invention. Of these drawings, FIG. 4 schematically shows the arrangement of essential circuit elements of motor driving devices disposed within a camera body and a lens.

DETAILED DESCRIPTION OF THE PREFERRED EMBODIMENTS

Figure 1:
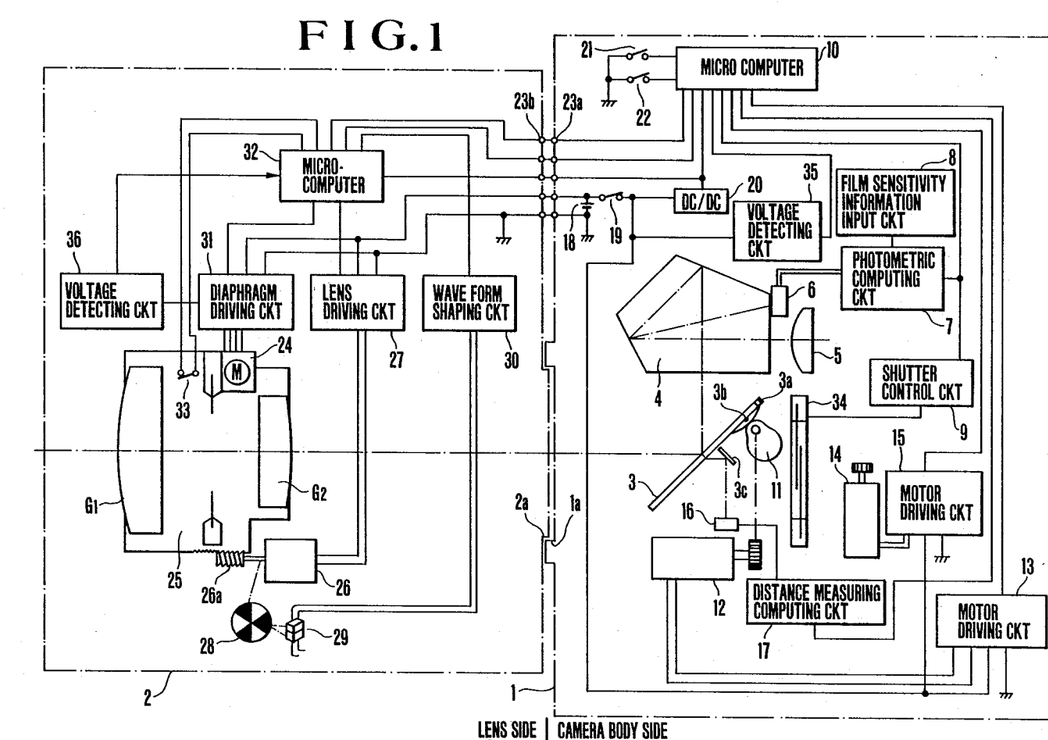
Figure 2:
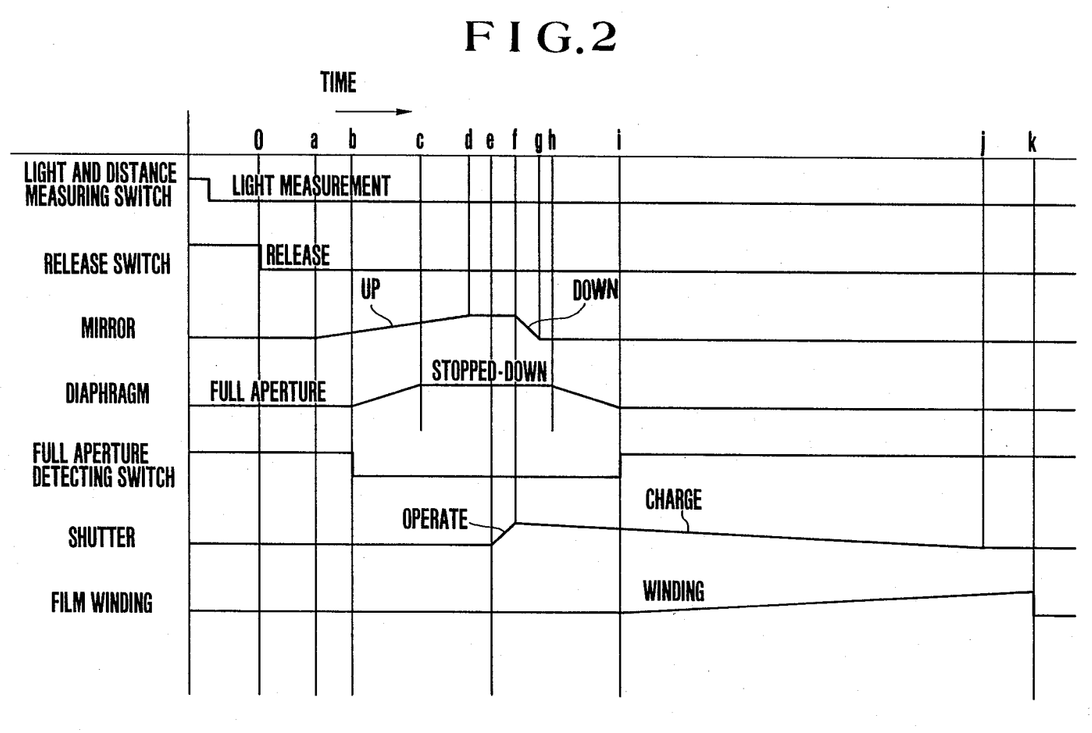
FIG. 2 is a timing chart.
Figure 3:
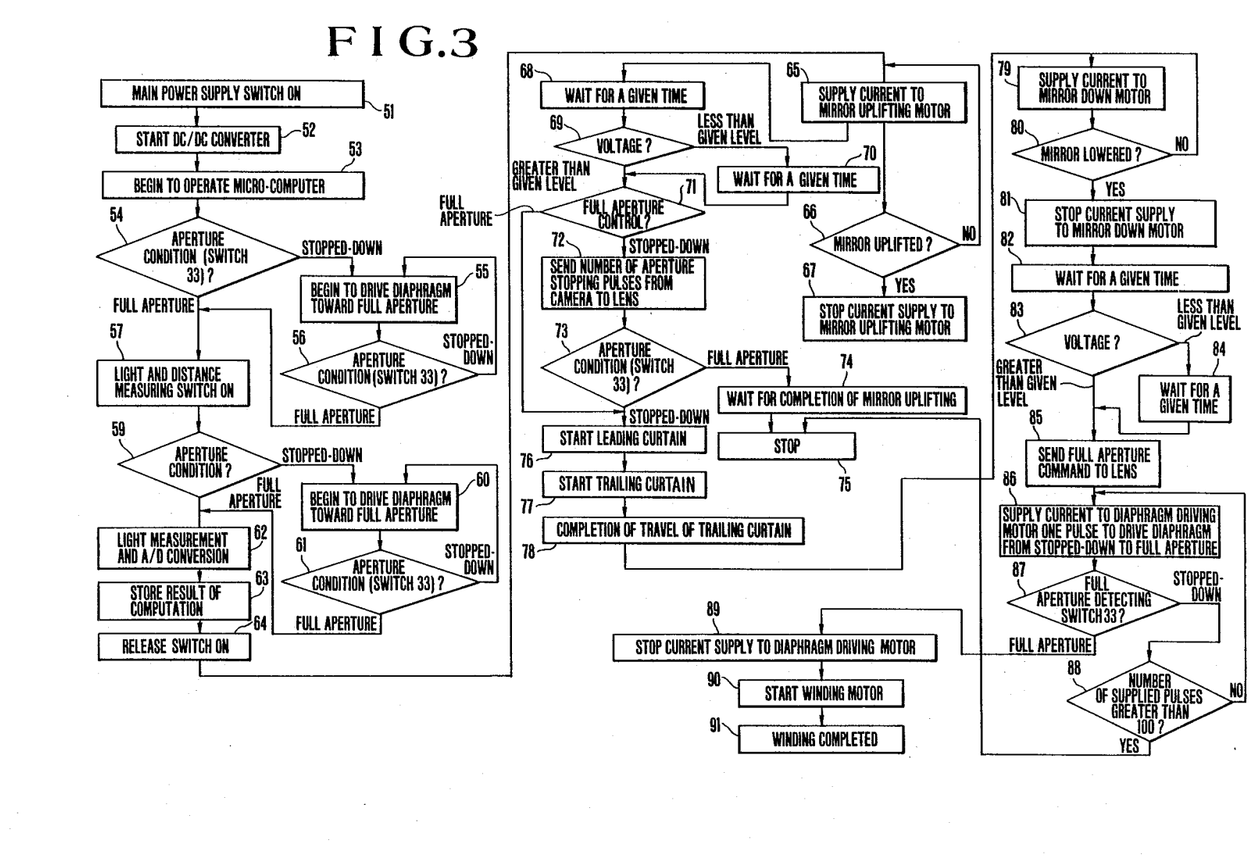
FIG. 3 is a flow chart.

Referring to FIGS. 1, 2 and 3, a first embodiment of this invention is arranged as follows: FIG. 1 is a schematic illustration of the essential circuit elements of motor driving devices arranged within a camera body and an interchangeable lens according to this invention. The illustration includes the camera body 1; the body of the interchangeable lens 2 which is detachably mounted on the camera body 1 by means of a mount 1a disposed on the side of the camera body 1 and a lens mount 2a on the side of the lens 2; a mirror 3; a pentagonal prism 4; an eyepiece 5; a light receiving element 6 which is provided for a photometric purpose; a photometric computing circuit 7 which is connected to a film sensitivity information input circuit 8, a shutter control circuit 9 and a micro-computer 10; a focal plane shutter 34; a mirror turning shaft 3a; a working pin 3b which is opposed to a mirror driving cam 11; a mirror driving motor 12 which is connected to a motor driving circuit 13; a film winding/rewinding motor 14 which is connected to a motor driving circuit 15; a distance measuring sensor 16 which is connected to a distance measuring computing circuit 17; a battery 18 which is arranged to be used for the operation of the whole camera system; a main power supply switch 19; a DC/DC converter 20 which is connected to the battery 18 and the micro-computer 10; a switch 21 which is provided for starting light and distance measuring processes; a shutter release switch 22; a group of contact pins 23a which are disposed on the side of the camera body 1 and are arranged in the vicinity of the mount 1a; and a group of contact pins 23b which are disposed on the side of the lens 2 and are opposed to the contact pin group 23a of the camera body 1. Photo taking optical lenses G1 and G2 are arranged to form a photo taking optical system 25 in conjunction with an electric motor driven diaphragm 24 which includes therein a diaphragm driving motor M. A lens driving motor 26 is provided for driving the lenses to be used for focal point adjustment and is connected to a lens driving circuit 27. The motor 26 has a gear 26a attached to its output shaft and is interlocked with a pulse disc 28. A photo-reflector 29 is opposed to the pulse disc 28 and is connected to a wave form shaping circuit 30. A diaphragm driving circuit 31 is connected to a micro-computer 32. A full aperture detecting switch 33 is connected to the micro-computer 32.

A voltage detecting circuit 35 is connected between the micro-computer 10 and the battery 18. Another voltage detecting circuit 36 is connected between the micro-computer 32 and the diaphragm driving circuit 31.

The camera system which is arranged as described above as a first embodiment of this invention operates as follows: When the main power supply switch 19 disposed on the camera body 1 is closed, the DC/DC converter 20 becomes operative and supplies a given actuating voltage to the micro-computer 10. When the light and distance measuring switch 21 is pushed, a quantity of light detected by the photometric light receiving element 6 is transmitted to the photometric computing circuit 7. The circuit 7 then stores information on an exposure amount by a known method. Meanwhile, the light and distance measuring switch 21 serves also as a trigger switch for automatic distance measurement. With this switch 21 pushed, an instruction from the micro-computer 10 renders the distance measuring sensor 16 operative. Then, the distance measuring computing circuit 17 performs a distance measurement computing operation in a known manner to determine thereby a lens drawing degree. Serial communication is then conducted in a known manner with the micro-computer 32 on the side of the lens 2. The micro-computer 32 instructs the lens driving circuit 27 with respect to the rotating direction of the motor 26. The position of the photo taking optical system 25 is thus shifted in the optical axis direction thereof. Then, at the same time, the pulse disc 28 rotates accordingly as the lens is shifted. The number of pulses thus obtained is read out by means of the photo reflector 29. The lens shifting degree is thus detectable in this manner. Therefore, with the photo taking optical system 25 thus shifted to the degree according to the instruction from the camera body 1, the lens is brought to a halt in an in-focus position. Generally, in that instance, distance measurement is then performed once again. If the lens is again determined to be in an in-focus position, either an in-focus display is made or an in-focus sound is produced on the side of the camera body.

Processes subsequent to the above are performed as shown in a timing chart in FIG. 2. Referring to FIG. 2, the processes mentioned in the foregoing are carried out prior to a point of time 0. In FIG. 2, the axis of abscissa shows time while the axis of ordinate shows the kinds of processes. When the shutter release switch 22 is pushed at the time point 0, the micro-computer 10 instructs the motor driving circuit 13 to rotate the mirror driving motor 12. The mirror driving cam 11 is then rotated to push the working pin 3b upward at a time point a. Then, the mirror 3 is also uplifted at a time point d. At the time point b which is delayed a given period of time from the time point a, serial communication is conducted in a known manner between the micro-computer 10 of the camera body 1 and the micro-computer 32 of the lens 2 through the contact pin groups 23a and 23b. Then, the lens is instructed to set the diaphragm at an aperture setting value obtained on the basis of a measured light value. The motor driven diaphragm 24 is then controlled by the diaphragm driving circuit 31 according to the aperture setting value designated by the camera. In this instance, a given time difference is provided in between the mirror uplifting time point a and the diaphragm driving point b. The reason for this is as follows: Immediately after the power supply is switched on, a large current flows to the mirror driving motor 12. Therefore the diaphragm is arranged not to be driven during the large current flowing period, so that the limited amount of energy of the power source can be efficiently used. The full aperture detecting switch 33 is in an open state before the time point b. The detecting switch 33 comes to close as soon as the aperture begins to be stopped down and is in a closed state after the time point b. The switch 33 thus indicates whether or not the diaphragm is in the full aperture position. While the full aperture detecting switch 33 is a mechanical on-off switch in the case of this specific embodiment, the switch 33 may be replaced with some other detecting switch, such as an MR element, a photo sensor or the like. The diaphragm is stopped down to the aperture setting value before a time point c. When the mirror 3 is completely uplifted at the time point d, an exposure effecting process begins at another time point e which gives some time allowance from the point c. In other words, the shutter is operated between the time points e and f. At the point f, a current supply begins to the mirror driving motor 12 according to an exposure completion signal. The mirror 3 is then moved downward and comes, at a time point g, back to its original position which permits a photometric action. Following that, for the same reason as in uplifting the mirror 3, a current is supplied to the mirror driving motor 12 and then, after the lapse of a given period of time, the diaphragm begins to be driven back to the full aperture position at a time point h. When the diaphragm is completely brought back to the full aperture position, the full aperture detecting switch 33 opens at a time point i. The mirror driving motor 12 is also arranged to have another function of performing a mechanical charging action on the focal plane shutter 34. The mirror driving motor 12, therefore, continues to operate up to a time point j. A signal which is produced at the above stated time point i is supplied via the micro-computer 32 to the micro-computer 10 on the side of the camera body 1. Then, the motor driving circuit 15 is instructed to have the film wound up by the film winding/rewinding motor 14. This film winding action comes to an end at a time point k. The sequence of processes of the camera system comes back to its original state. The camera system thus becomes ready for performing light and distance measuring actions.

While the series of photographing actions of the camera system of the invention is as described above, a more complete sequential operation relative to the electrically-driven diaphragm is as described below with reference to FIG. 3, which is a flow chart:

Referring to FIG. 3, when the main power supply switch 19 is turned on at a step 51, the DC/DC converter 20 begins to operate at a step 52. At a step 53, the micro-computers 10 and 32 are rendered operative. At a step 54, the full aperture detecting switch 33 is checked to find if the motor driven diaphragm 24 is in its full aperture position. If the diaphragm blades are found to be spreading into the optical path due to some reason, the operation proceeds to a step 55. At the step 55, the diaphragm driving circuit 31 is instructed to retract the diaphragm blades. At a step 56, if the diaphragm is found to have reached its full aperture position through the full aperture detecting switch 33, the backward driving action on the diaphragm blades is brought to a stop. As stated above, a closing operation on the main power supply switch 19 brings the diaphragm into the full aperture position. In this instance, if the diaphragm is found to have not come back to its full aperture position, the power supply is terminated when the number of pulses reaches a given number and a reset display is made on the camera body.

Next, if the light and distance measuring switch 21 is turned on at a step 57, the diaphragm is checked for its position at a step 59. The processes of steps 59 to 61 are identical with the steps 54 to 56 and, therefore require no description. At a step 62, light measurement and A/D conversion are performed. At a step 63, the result of computation is stored. At a step 64, the release switch 22 is turned on. At a step 65, the mirror driving motor 12 is allowed to rotate to uplift the mirror 3. A power supply to the motor 12 continues at steps 66 and 67 until completion of the mirror uplifting action is detected. The power supply is terminated when completion of mirror uplifting is detected. Further, at the step 65, a timer which is not shown begins to operate concurrently with commencement of the power supply to the mirror driving motor 12. At a step 68, the operation waits for a given period of time. After that, at a step 69, the voltage of the power source disposed within the camera body 1 is checked by means of the voltage detecting circuit 35. If the voltage is found to be lower than a given level, the operation waits for a given period of time at a step 70. If the voltage is found to be above the given level, the operation proceeds directly to a step 71. At the step 71, a discrimination is made as to whether the diaphragm is to be left in the full aperture position or its aperture must be stopped down. If the diaphragm can be left in the full aperture position, the leading curtain of the shutter is allowed to travel at a step 76. If the diaphragm aperture must be stopped down, a number of stopping down pulses are sent from the camera body 1 to the lens 2 at a step 72. At a step 73, the full aperture detecting switch 33 is checked to see if the motor driven diaphragm 24 is in the full aperture position. If so, the mirror 3 is left in its uplifted state at a step 74 and the sequential operation is stopped and the operator is informed of an accident. If the full aperture detecting switch 33 is found closed at the step 73, the leading shutter curtain is allowed to start at the step 76 and the trailing shutter curtain to start at a step 77. Then, at a step 78, a trailing shutter curtain travel completion signal is produced. At a step 79, a current is supplied to the mirror driving motor 12 to move the mirror downward in response to this completion signal. At a step 80, a check is made to see if the mirror 3 has been moved down. If so, the current supply to the motor 12 is cut off at a step 81. If not, the operation comes back to the step 79. At a step 82, a timer which is not shown is actuated and the operation waits for a given period of time. At a step 83, the power source voltage within the camera body 1 is checked with the voltage detecting circuit 35. If the voltage is lower than a given level, the operation waits for a given period of time at a step 84. If the voltage is found to be above the given level, the operation proceeds directly to a step 85. At the step 85, an aperture open instruction is sent to the lens. At steps 86 to 89, the position of the full aperture detecting switch 33 is checked every time one pulse is supplied for moving the diaphragm driving motor M in the direction of driving the diaphragm toward the full aperture position. Then, when the switch 33 is found closed, a check is made to see if the number of the pulses supplied is more than 100. If not, the supply continues. If so, a jump takes place to the step 75 and the sequential operation comes to a halt to inform the operator of an accident. If the full aperture detecting switch 33 is found to be open at the step 87, the pulse supply to the diaphragm driving motor M is halted at a step 89. Then, at a step 90, the film winding/rewinding motor 14 begins to perform film winding. At a step 91, completion of film winding is detected and one round of photographing sequence of operation comes to an end. After that, the operation comes back to the step 57 at which the light and distance measuring switch 21 is turned on for another round.

As shown at the steps 68 and 82 of the flow chart, the motor driven diaphragm 2 is arranged to be operated after the lapse of a given length of waiting time both when the mirror 3 is uplifted and when the mirror 3 is moved down. This arrangement effectively staggers the timing of the peak of power supply to the mirror driving motor 12 and that of the peak of power supply to the diaphragm driving motor M. Therefore, the limited power source voltage can be efficiently utilized by preventing the rush currents from overlapping at the start of power supply to these motors. Further, as above stated, there is provided a waiting time at each of the steps 68 and 82 before making a check for the power source voltage at the ensuing steps 69 and 83. If the voltage is found to be lower than a given value, another waiting time is provided at each of the ensuing steps 70 and 84. This arrangement is made for the purpose of further staggering the above stated peaks of the power supply to the mirror driving and diaphragm driving motors in case of an unexpectedly low voltage level of the battery 18 under a low temperature condition or something of the like.

In the first embodiment which is a camera system arranged to have a power supply effected from the camera body to the lens via contacts arranged between them for driving the diaphragm of the lens by means of a motor, the limited power source voltage can be very efficiently utilized, as described in the foregoing, by staggering the peak times of power supply to the motors provided for driving the mirror and the diaphragm.

Further, the embodiment is also arranged to be capable of effectively coping with a sudden drop of the power source voltage due to a low temperature or the like by staggering the time points of the power supply peaks.

Another advantage of the first embodiment lies in that: The diaphragm is arranged to be shifted back to the full aperture position by means of an exposure amount adjusting device after the lapse of a given period of time from a point of time when the mirror is brought back to its initial position by the mirror driving means. Then, film winding is allowed to begin only after confirmation of the full aperture state of the diaphragm. This arrangement effectively prevents the electric circuits of the camera from failing to operate or from erroneously operating due to a drop in the power source voltage.

A further advantage of the embodiment lies in that: The length of time after returning the mirror to its initial position and before the exposure amount adjusting device comes to operate is arranged to be variable according to the level of the power source voltage. That arrangement ensures a highly reliable camera operation even in the event of a sudden drop of the power source voltage due to a low temperature condition, etc.

Figure 4:
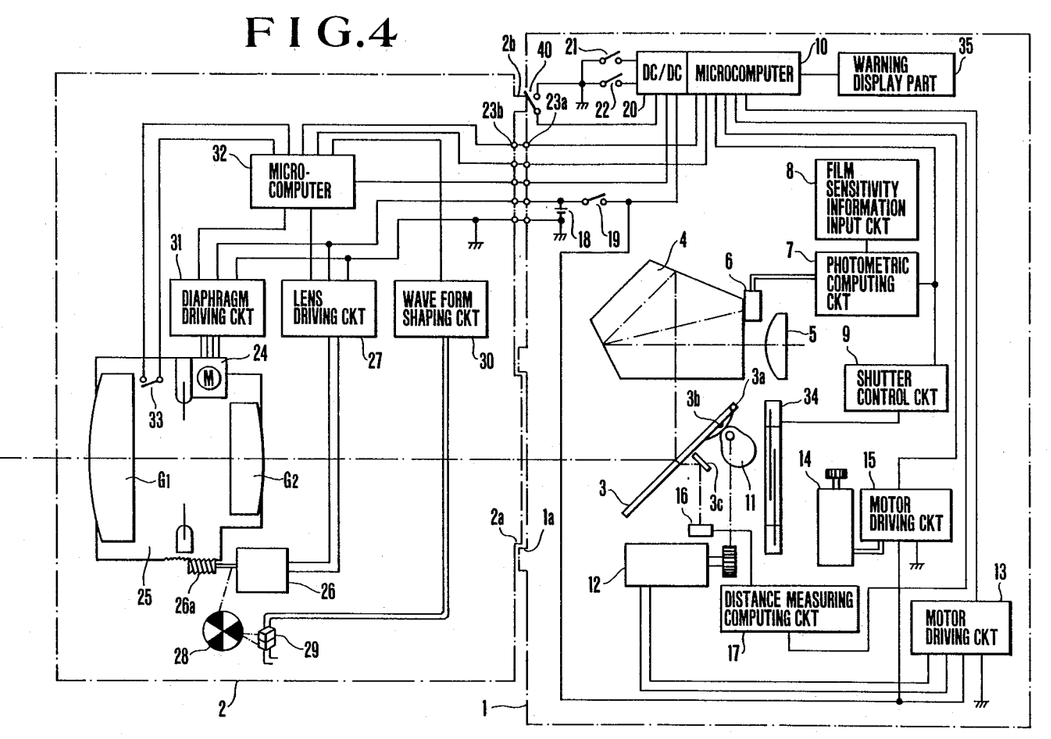
Figure 5:
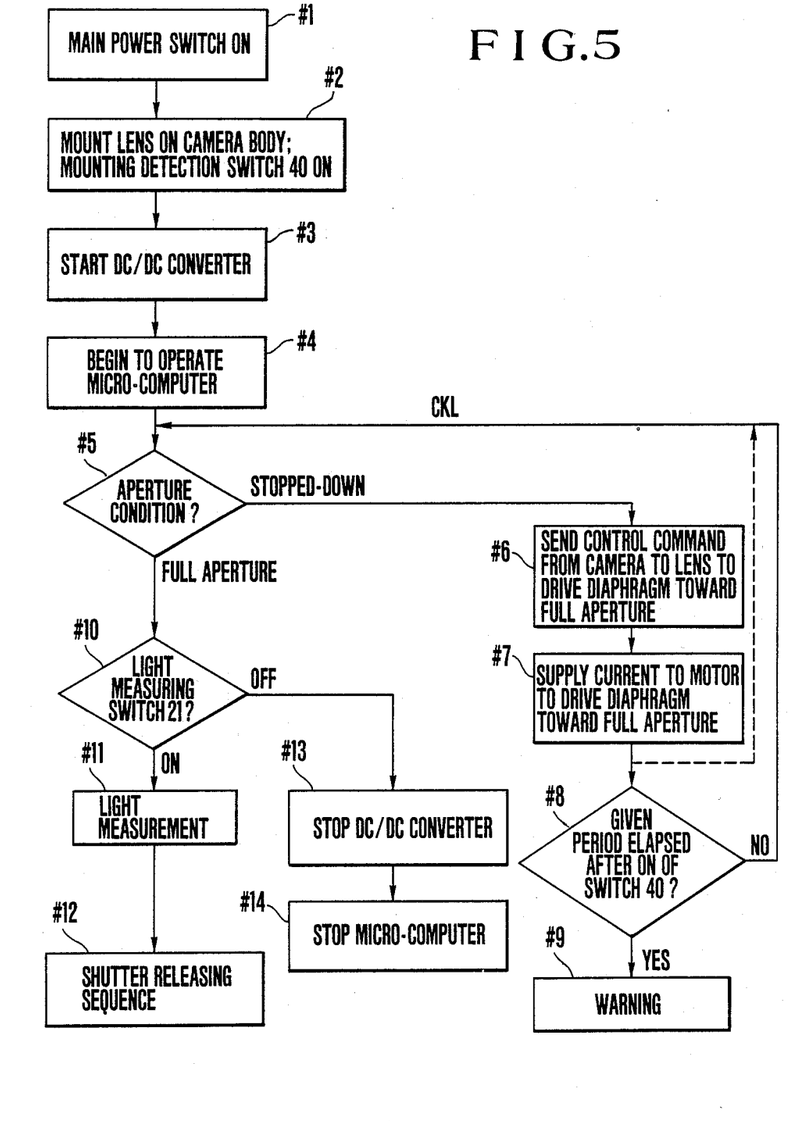
FIG. 5 is a flow chart.

Referring to FIGS. 4 and 5, a second embodiment of this invention is described as follows: The components of the camera system arranged in the same manner as those of the first embodiment described in the foregoing are indicated by the same reference numerals and the details of them are omitted from description. The arrangement of the second embodiment differs from that of the first embodiment as follows: A mount detecting switch 40 is disposed on the side of the camera body 1. The switch 40 is arranged to be closed when the mount 2a of the photo taking lens 2 is completely coupled with the mount 1a of the camera body 1 by a contact pushing member 2b which is disposed at the mount 2a of the lens 2. A warning display part 35 is arranged to give a warning in the event of a malfunction of the motor driven diaphragm 24.

The camera system which is arranged as the second embodiment of this invention as described above operates as described below with reference to the flow chart of FIG. 5:

Referring to FIG. 5, at a step #1, the DC/DC converter 20 turns on when the main power supply switch 19 is closed. The DC/DC converter 20 then supplies a given voltage to the micro-computer 10 disposed on the side of the camera body 1 and to the micro-computer 32 disposed on the side of the lens 2. This brings them into a stand-by state. At a step #2, the lens 2 is mounted on the camera body 1 by coupling the mount 1a and the mount 2a with each other. Upon completion of this mounting process, the mount detecting switch 40 is closed by the contact pushing member 2b which is provided on the mount 2a of the lens 2. At a step #3, the closing of the switch 40 actuates the DC/DC converter 20 to raise the output thereof. At a step #4, the micro-computer 10 begins to operate. At a step #5, the full aperture detecting switch 33 is checked to see if the motor driven diaphragm 24 of the photo taking lens 2 is in its full aperture position. The detecting switch 33 is closed when the diaphragm aperture is in a stopped down state due to some impact or the like on the diaphragm 24. In that event, at a step #6, the micro-computer 10 of the camera body 1 instructs the micro-computer 32 of the lens 2, through the contacts 23a and 23b, to bring the diaphragm 24 to the full aperture position. At steps #7 and #8, the micro-computer 32 of the photo taking lens 2 instructs the diaphragm driving circuit 31 to have the stepper motor M shift the position of the diaphragm 24 toward the full aperture. The power supply to the stepper motor M continues from the closing of the mount detecting switch 40 until the lapse of a given period of time, say, one second, and until the full aperture detecting switch 33 opens. If the switch 33 remains closed, that is, if the diaphragm fails to come to the full aperture position, even after the lapse of the given period of time, the micro-computer 10 instructs, at a step #9, the warning display part 35 which is composed of either a lamp or buzzer or the like. This informs the operator of an accident.

If the full aperture detecting switch 33 opens indicating that the photo taking lens 2 comes to have the full aperture within the above stated given period of time, the sequential operation proceeds to a step #10. At the step #10, a check is made for the state of the photometric switch 21. If the switch 21 is found to be closed, the operation comes to a step #11 at which light is measured. At a step #12, a shutter release sequence of operation is performed in a known manner including a shutter opening and closing action. If the photometric switch 21 is found to be in an open state at the step #10, the output of the DC/DC converter 20 comes down after the lapse of a given period of time at a step #13. Then, at a step #14, the micro-computers 10 and 30 cease to operate.

In the above stated arrangement, the length of time lapsed after the mount detecting switch 40 is turned on is measured at the step #8 and a warning is given at the step #9 after the lapse of the given length of time. However, the steps #8 and #9 may be omitted and the flow of operation may be changed to execute a flow of steps in the order of the step #6—the step #7—the step #5—the step #6—the step #7—the step #5 until change-over takes place in the state of the full aperture detecting switch 33 (as indicated by a broken line in FIG. 5).

The second embodiment is arranged, as described in the foregoing, to effect power supply to the diaphragm driving motor to bring the diaphragm into the full aperture position if the diaphragm of the photo taking lens is not in the full aperture position when the mount of the lens is completely coupled with the mount of the camera body. The second embodiment thus ensures that the photo taking lens is always in the full aperture state when the operator of the camera looks into the view finder before the photometric switch is operated. The arrangement facilitates a focusing operation. Further, compared with the conventional method of operating the photometric switch, the time lag before opening the shutter can be lessened. The embodiment thus has an advantage in respect of seizing a shutter chance.

Further, since the diaphragm of the lens is always in a full aperture position, when, for example, a store clerk lets a customer look into the view finder of the camera at a camera store, the arrangement of the embodiment keeps the view finder in a bright state.

What is claimed is:

1. A camera system having a camera body and an interchangeable lens body which is detachably mountable on said camera body, comprising:
    (a) said camera body including:
        (a-1) a power source;
        (a-2) a first motor arranged to be operated by a power supply from said power source;
        (a-3) mirror driving means arranged to be driven by said first motor to move a mirror both upward and downward according to the operation of said first motor; and
        (a-4) means for effecting a power supply to said interchangeable lens body;
    (b) said interchangeable lens body including:
        (b-1) a second motor arranged to be operated by a power supply from said power source;
        (b-2) diaphragm driving means arranged to be driven by said second motor and to drive a diaphragm both in the directions of stopping down and opening the aperture thereof according to the operation of said second motor; and
        (b-3) means for receiving said power supply from said camera body; and
    (c) control means for controlling the operations of said first and second motors, said control means being arranged to actuate said first motor to cause said mirror driving means to move said mirror upward, to actuate said second motor to cause said diaphragm driving means to drive said diaphragm in the direction of stopping down the aperture thereof after the lapse of a given period of time from commencement of the upward movement of said mirror, to actuate said first motor to cause said mirror driving means to move said mirror downward and to actuate said second motor to cause said diaphragm driving means to drive said diaphragm in the direction of opening the aperture thereof after the lapse of a given period of time from the end of the downward movement of said mirror.

2. A system according to claim 1, further comprising detecting means for detecting information on the voltage of said power source, said control means being arranged to make longer at least one of said given periods of time when the voltage information detected by said detecting means is lower than a predetermined value.

3. A system according to claim 1, wherein said control means includes a camera-side micro-computer which is disposed within said camera body and a lens-side micro-computer which is disposed within said interchangeable lens body; said two micro-computers are arranged to communicate with each other via a group of contact pins disposed on the side of the camera body and a group of contact pins disposed on the side of said lens; said first motor is arranged to operate under instructions from said camera-side micro-computer; and said second motor is arranged to operate under instructions from said lens-side micro-computer.

4. A camera system having a camera body and an interchangeable lens body which is detachably mountable on said camera body, comprising:
    (a) said camera body including:
        (a-1) a power source;
        (a-2) a first motor arranged to be operated by a power supply from said power source;
        (a-3) mirror driving means arranged to be driven by said first motor to move a mirror at least upward according to the operation of said first motor; and
        (a-4) means for effecting a power supply to said interchangeable lens body;
    (b) said interchangeable lens body including:
        (b-1) a second motor arranged to be operated by a power supply from said power source;
        (b-2) diaphragm driving means arranged to be driven by said second motor and to drive a diaphragm both in the directions of stopping down and opening the aperture thereof according to the operation of said second motor; and
        (b-3) means for receiving a power supply from said camera body; and
    (c) control means for controlling the operations of said first and second motors, said control means being arranged to actuate said first motor to cause said mirror driving means to move said mirror upward and to actuate said second motor to cause said diaphragm drive means to drive said diaphragm in the direction of stopping down the aperture thereof after the lapse of a given period of time from commencement of the upward movement of said mirror.

5. A system according to claim 4, further comprising detecting means for detecting information on the voltage of said power source, said detecting means being arranged to detect voltage information while said first motor is in operation, and said control means being arranged to change said given period of time according to the result of detection made by said detecting means, so that said given period of time is extended when said voltage information is lower than a predetermined level.

6. A system according to claim 4, wherein said control means includes a camera-side micro-computer which is disposed within said camera body and a lens-side micro-computer which is disposed within said interchangeable lens body; said two micro-computers are arranged to communicate with each other via a group of contact pins disposed on the side of the camera body and a group of contact pins disposed on the side of said lens; said first motor is arranged to operate under instructions from said camera-side micro-computer; and said second motor is arranged to operate under instructions from said lens-side micro-computer.

7. A camera system having a camera body and an interchangeable lens which is detachably mounted on said camera body, comprising:
(a) said camera body including:
  (a-1) a power source;
  (a-2) a first motor arranged to be operated by a power supply from said power source;
  (a-3) mirror driving means arranged to be driven by said first motor to move a mirror at least downward according to the operation of said first motor; and
  (a-4) means for effecting a power supply to said interchangeable lens body;
(b) said interchangeable lens body including:
  (b-1) a second motor arranged to be operated by a power supply from said power source;
  (b-2) diaphragm driving means arranged to be driven by said second motor and to drive a diaphragm both in the directions of stopping down and opening the aperture thereof according to the operation of said second motor; and
  (b-3) means for receiving a power supply from said camera body; and
(c) control means for controlling the operations of said first and second motors, said control means being arranged to actuate said first motor to cause said mirror driving means to move said mirror downward and to actuate said second motor to cause said diaphragm driving means to drive said diaphragm in the direction of opening the aperture thereof after the lapse of a given period of time from the downward movement of said mirror;
further comprising detecting means for detecting information on the voltage of said power source, said detecting means being arranged to detect said voltage information and said control means being arranged to change said given period of time according to the result of detection made by said detecting means, so that said given period of time is extended when said voltage information is lower than a predetermined level.

8. A system according to claim 7, wherein said control means includes a camera-side micro-computer which is disposed within said camera body and a lens-side micro-computer which is disposed within said interchangeable lens body; said two micro-computers are arranged to communicate with each other via a group of contact pins disposed on the side of the camera body and a group of contact pins disposed on the side of said lens; said first motor is arranged to operate under instructions from said camera-side micro-computer; and said second motor is arranged to operate under instructions from said lens-side micro-computer.

9. An interchangeable lens body arranged to be detachably mountable on a camera body, comprising:
(a) a motor arranged within said lens body to be operated by a power supply from said camera body;
(b) diaphragm driving means arranged to be driven by said motor disposed within said lens body, said diaphragm driving means being arranged both to stop down and to open the aperture of a diaphragm according to the operation of said motor in said lens body;
(c) means for receiving a power supply from said camera body;
(d) means for communicating with said camera body; and
(e) control means for controlling the operation of said motor in said lens body, said control means being arranged to cause said diaphragm driving means to drive said diaphragm to stop down the aperture thereof by actuating said motor in said lens body after the lapse of a given period of time from when said communicating means receives a signal indicating that a motor disposed within said camera body has begun to uplift a mirror within said camera body.

10. A camera system having a camera body and an interchangeable lens which is detachably mountable on said camera body, comprising:
(a) said camera body including:
  (a-1) a power source;
  (a-2) a first motor arranged to be operated by a power supply from said power source;
  (a-3) mirror driving means arranged to be driven by said first motor to move a mirror at least downward according to the operation of said first motor; and
  (a-4) means for effecting a power supply to said interchangeable lens body;
(b) said interchangeable lens body including:
  (b-1) a second motor arranged to be operated by a power supply from said power source;
  (b-2) diaphragm driving means arranged to be driven by said second motor and to drive a diaphragm both in the directions of stopping down and opening the aperture thereof according to the operation of said second motor; and
  (b-3) means for receiving a power supply from said camera body; and
(c) control means for controlling the operations of said first and second motors, said control means being arranged to actuate said first motor to cause said mirror driving means to move said mirror downward and to actuate said second motor to cause said diaphragm driving means to drive said diaphragm in the direction of opening the aperture thereof after the lapse of a given period of time from the downward movement of said mirror;
wherein said control means is arranged to cause said diaphragm to be driven in the direction of opening the aperture thereof by actuating said second motor after the lapse of a given period of time from detection of completion of the downward movement of said mirror caused by said first motor.

11. An interchangeable lens arranged to be detachably mountable on a camera body, comprising:
(a) a motor arranged within said lens body to be operated by a power supply from said camera body:
(b) diaphragm driving means arranged to be driven by said motor in said lens body to drive a diaphragm both to stop down and to open the aperture thereof according to the operation of said motor in said lens body;
(c) means for receiving a power supply from said camera body;
(d) means for communicating with said camera body; and
(e) control means for controlling the operation of said motor in said lens body, said control means being arranged to cause said diaphragm to be driven by said diaphragm driving means in the direction of opening the aperture thereof by actuating said motor in said lens body after the lapse of a given period of time from when said communicating means receives a signal indicating completion of a downward movement of a mirror caused by a motor which is provided within said camera body to move said mirror downward.

12. A camera system having a camera body and an interchangeable lens body which is detachable mountable on said camera body, comprising:
   (a) said camera body, including:
      (a-1) a power source;
      (a-2) a first motor arranged to be operated by a power supply from said power source;
      (a-3) film feeding means arranged to be driven by said first motor to feed one frame portion of a film at a time according to the operation of said first motor; and
      (a-4) means for effecting a power supply to said interchangeable lens body;
   (b) said interchangeable lens body including:
      (b-1) a second motor arranged to be operated by said power supply from said camera body;
      (b-2) diaphragm driving means to be operated by said second motor, said diaphragm driving means being arranged to drive a diaphragm both to stop down and to open the aperture thereof according to the operation of said second motor;
      (b-3) means for detecting a full aperture state of said diaphragm; and
      (b-4) means for receiving a power supply from said camera body; and
   (c) control means for controlling the operations of said first and second motors, said control means being arranged to cause said diaphragm driving means to drive the diaphragm to open the aperture thereof by actuating said second motor and to cause said film feeding means to perform a film feeding action by actuating said first motor after the full aperture state of said diaphragm is detected by said detecting means.

13. A system according to claim 12, wherein said control means includes a camera-side micro-computer which is disposed within said camera body and a lens-side micro-computer which is disposed within said interchangeable lens body; said two micro-computers are arranged to communicate with each other via a group of contact pins disposed on the side of the camera body and a group of contact pins disposed on the side of said lens; said first motor is arranged to operate under instructions from said camera-side micro-computer; and said second motor is arranged to operate under instructions from said lens-side micro-computer.

14. An interchangeable lens body arranged to be detachably mountable on a camera body, comprising:
   (a) a motor arranged within said interchangeable lens body to be operated by a power supply from a power source disposed within said camera body;
   (b) a diaphragm driving means to be operated by said motor in said lens body, said diaphragm driving means being arranged to drive a diaphragm both to stop down and to open according to the operation of said motor disposed within said lens body;
   (c) detecting means for detecting the full aperture state of said diaphragm;
   (d) means for receiving a power supply from said camera body;
   (e) communicating means for communication with said camera body; and
   (f) control means for controlling the operation of said motor in said lens body, said control means being arranged to cause said diaphragm driving means to drive said diaphragm to open the aperture thereof by actuating said motor in said lens body and, after the full aperture state of said diaphragm is detected by said detecting means, to produce a signal through said communicating means for allowing a motor disposed within said camera body to begin to operate for film feeding.

15. An interchangeable lens body according to claim 14, further comprising a focusing motor for moving a lens related to a focusing in the direction of the optical axis of said lens, and a control circuit for said focusing motor.

16. A camera system having a camera body and an interchangeable lens body which is detachably mountable on said camera body, comprising:
   (a) said camera body including:
      (a-1) a power source;
      (a-2) a power supply switch arranged to perform a switching action in response to an external operation performed thereon and to supply the voltage of said power source to each applicable circuit; and
      (a-3) means for supplying said voltage to said interchangeable lens body;
   (b) said interchangeable lens body including;
      (b-1) a motor arranged within said lens body to be operated by the voltage of said power source;
      (b-2) diaphragm driving means to be operated by said motor in said lens body, said diaphragm driving means being arranged to drive a diaphragm both to stop down and to open the aperture thereof according to the operation of said motor in said lens body;
      (b-3) detecting means for detecting means whether said diaphragm is in a full aperture state; and
      (b-4) means for receiving a power supply from said camera body; and
   (c) control means for controlling the operation of said motor disposed within said lens body, said control means being arranged to actuate said detecting means at the beginning of a voltage supply to said interchangeable lens body in response to the switching action of said power supply switch, to let said detecting means detect the state of said diaphragm, and to cause said diaphragm driving means to drive said diaphragm to open by actuating said motor in said lens when said diaphragm is detected to be not in said full aperture state;
further comprising warning means for giving a warning when said full aperture state of said diaphragm is not detected by said detecting means even after said motor in said lens body is driven and controlled by said control means.

17. A camera system having a camera body and an interchangeable lens body which is detachably mountable on said camera body, comprising:
   (a) said camera body including:
      (a-1) a power source;
      (a-2) a power supply switch arranged to perform a switching action when said interchangeable lens body is mounted on said camera body and to supply the voltage of said power source to each applicable circuit; and
      (a-3) means for supplying said voltage to said interchangeable lens body;

(b) said interchangeable lens body including:
  (b-1) a motor arranged within said lens body to be rendered operative by said power source voltage;
  (b-2) diaphragm driving means arranged to be operated by said motor in said lens body and to drive a diaphragm both to stop down and to open the aperture thereof according to the operation of said motor in said lens body;
  (b-3) detecting means for detecting whether said diaphragm is in a full aperture state; and
  (b-4) means for receiving a power supply from said camera body; and
(c) control means for controlling the operation of said motor disposed within said lens body, said control means being arranged to actuate and cause said detecting means to detect the state of said diaphragm when a voltage supply begins to said interchangeable lens body in response to the switching action of said power supply switch and, if said diaphragm is detected to be not in said full aperture state, to cause said diaphragm driving means to drive said diaphragm to open the aperture thereof by actuating said motor in said lens body.

18. A system according to claim 17, further comprising comprising warning means for giving a warning when said full aperture state of said diaphragm is not detected by said detecting means even after said motor in said lens body is driven and controlled by said control means.

19. A camera comprising:
(a) a power source;
(b) a first motor arranged to be operated by a power supply from said power source;
(c) mirror driving means arranged to be driven by said first motor to move a mirror at least upward according to the operation of said first motor;
(d) a second motor arranged to be operated by a power supply from said power source;
(e) diaphragm driving means arranged to be driven by said second motor and to drive a diaphragm both in the directions of stopping down and opening the aperture thereof according to the operation of said second motor; and
(f) control means for controlling the operations of said first and second motors, said control means being arranged to actuate said first motor to cause said mirror driving means to move said mirror upward and to actuate said second motor to cause said diaphragm drive means to drive said diaphragm in the direction of stopping down the aperture thereof after the lapse of a given period of time from commencement of the upward movement of said mirror.

20. A camera according to claim 19, further comprising detecting means for detecting information on the voltage of said power source, said detecting means being arranged to detect voltage information while said first motor is in operation, and said control means being arranged to change said given period of time according to the result of detection made by said detecting means, so that said given period of time is extended when said voltage information is lower than a predetermined level.

21. A camera body to which an interchangeable lens having a lens side motor for driving a diaphragm can be detachably mounted, comprising:
(a) a power source;
(b) a camera side motor arranged to be operated by a power supply from said power source;
(c) mirror driving means arranged to be driven by said camera side motor to move a mirror at least upward according to the operation of said camera side motor; and
(d) control means for controlling the operations of said camera side motor, said control means generating a signal to said interchangeable lens body for driving said lens side motor to a stop down direction after an elapse of a given period of time after starting to up-lift said mirror by said mirror driving means by actuating said camera side motor.

22. A camera body according to claim 21, further comprising detecting means for detecting information on the voltage of said power source, said detecting means being arranged to detect voltage information while said camera side motor is in operation, and said control means being arranged to change said given period of time according to the result of detection made by said detecting means, so that said given period of time is extended when said voltage information is lower than a predetermined level.

23. A camera, comprising:
(a) a power source;
(b) a first motor arranged to be operated by a power supply from said power source;
(c) mirror driving means arranged to be driven by said first motor to move a mirror at least downward according to the operation of said first motor;
(d) a second motor arranged to be operated by a power supply from said power source;
(e) diaphragm driving means arranged to be driven by said second motor and to drive a diaphragm both in the directions of stopping down and opening the aperture thereof according to the operation of said second motor;
(f) detecting means for detecting information on the voltage of said power source, and
(g) control means for controlling the operations of said first and second motors, said control means being arranged to actuate said first motor to cause said mirror driving means to move said mirror downward and to actuate said second motor to cause said diaphragm driving means to drive said diaphragm in the direction of opening the aperture thereof after the lapse of a given period of time from the downward movement of said mirror, said control means being arranged to change said given period of time according to the result of detection mode by said detecting means, so that said given period of time is extended when said voltage information is lower than a predetermined level.

24. A camera body to which an interchangeable lens having a lens side motor for driving a diaphragm can be mounted, comprising:
(a) a power source;
(b) a camera side motor arranged to be operated by a power supply from said power source;
(c) mirror driving means arranged to be driven by said camera side motor to move a mirror at least downward according to the operation of said camera side motor;
(d) detecting means for detecting information on the voltage of said power source; and
(e) control means for controlling the operations of said camera side motor, said control means actuating said camera side motor for descending said mirror by said mirror driving motor, then after an elapse of a given period of time issuing a signal to said interchangeable lens body for driving said lens side motor in an aperture opening direction, said control means being arranged to change said given period of time according to the result of detection made by said detecting means, so that said given period of time is extended when said voltage information is lower than a predetermined level.

25. A camera body according to claim 24, wherein said control means is arranged to cause said diaphragm to be driven in the direction of opening the aperture thereof according to an output of said signal after said elapse.

26. A camera system having a camera body and an interchangeable lens body which is detachably mountable on said camera body, comprising:
    (a) said camera body including:
        (a-1) first detecting means for detecting a mounting of said lens body;
    (b) said interchangeable lens body including;
        (b-1) a motor arranged within said lens body;
        (b-2) diaphragm driving means to be operated by said motor in said lens body, said diaphragm driving means being arranged to drive a diaphragm both to stop down and to open the aperture thereof according to the operation of said motor in said lens body;
        (b-3) second detecting means for detecting whether said diaphragm is in a full aperture state; and
    (c) control means for controlling the operation of said motor disposed within said lens body, said control means detecting a state of said diaphragm by said second detecting means when the mounting of said lens body is detected by said first detecting means, then if said diaphragm is detected to be not in said full aperture state, operating said motor for driving said diaphragm into said full aperture state by said diaphragm driving means.

27. A system according to claim 26, further comprising warning means for giving a warning when said full aperture state of said diaphragm is not detected by said second detecting means even after said motor in said lens body is driven by said control means.

28. An interchangeable lens body detachably mountable to a camera body having a camera body side detecting means for detecting a mounted state, comprising:
    (a) a motor arranged within said lens body;
    (b) diaphragm driving means to be operated by said motor in said lens body, said diaphragm driving means being arranged to drive a diaphragm both to stop down and to open the aperture thereof according to the operation of said motor in said lens body;
    (c) diaphragm detecting means for detecting whether said diaphragm is in a full aperture state; and
    (d) control means for controlling the operation of said motor disposed within said lens body, said control means detecting a state of said diaphragm by said diaphragm detecting means when a signal relating to a detection of a mounting by said camera side detecting means is received from said camera body, and if said diaphragm is detected to be not in said full aperture state, operating said motor for driving said diaphragm to said full aperture state by said diaphragm driving means.

* * * * *

UNITED STATES PATENT AND TRADEMARK OFFICE
CERTIFICATE OF CORRECTION

PATENT NO. : 4,841,327

DATED : June 20, 1989

INVENTOR(S) : Hiroshi Yamamoto, et al.

It is certified that error appears in the above-identified patent and that said Letters Patent is hereby corrected as shown below:

ON THE TITLE PAGE,
AT [56] References Cited:

"3,911,453  10/1975  Ohmori" should read
--3,911,454 10/1975 Ohmori--.

COLUMN 2:

Line 46, "aspect" should read --object--.

COLUMN 4:

Line 59, "point b." should read --time point b.--.

COLUMN 5:

Line 11, "point c." should read --time point c.--.

Line 13, "point f," should read --time point f,--.

UNITED STATES PATENT AND TRADEMARK OFFICE
CERTIFICATE OF CORRECTION

PATENT NO. : 4,841,327

DATED : June 20, 1989

INVENTOR(S) : Hiroshi Yamamoto, et al.

It is certified that error appears in the above-identified patent and that said Letters Patent is hereby corrected as shown below:

COLUMN 7:

Line 4, "motor driven diaphragm 2" should read --motor driven diaphragm 24--.

COLUMN 8:

Line 56, "ation" should read --ations--.

Line 61, "micro-computers 10 and 30" should read --micro-computers 10 and 32--.

COLUMN 10:

Line 46, "diaphragm drive means" should read --diaphragm driving means--.

UNITED STATES PATENT AND TRADEMARK OFFICE
CERTIFICATE OF CORRECTION

PATENT NO. : 4,841,327
DATED : June 20, 1989
INVENTOR(S) : Hiroshi Yamamoto, et al.

It is certified that error appears in the above-identified patent and that said Letters Patent is hereby corrected as shown below:

COLUMN 13:

Line 8, "detachable" should read --detachably--.

Line 10, "body," should read --body--.

COLUMN 14:

Line 28, "including;" should read --including:--

Line 37, "means" (second occurrence) should be deleted.

COLUMN 15:

Line 26, "comprising" should be deleted.

Line 50, "diaphragm drive means" should read --diaphragm driving means--.

UNITED STATES PATENT AND TRADEMARK OFFICE
CERTIFICATE OF CORRECTION

PATENT NO. : 4,841,327

DATED : June 20, 1989

INVENTOR(S) : Hiroshi Yamamoto, et al.

It is certified that error appears in the above-identified patent and that said Letters Patent is hereby corrected as shown below:

COLUMN 16:

Line 39, "source" should read --source;--.

Line 51, "mode" should read --made--.

COLUMN 17:

Line 1, "mirror driving motor" should read --mirror driving means--.

Signed and Sealed this

Twenty-first Day of January, 1992

Attest:

HARRY F. MANBECK, JR.

*Attesting Officer*　　　　　*Commissioner of Patents and Trademarks*